United States Patent
Blanchet et al.

(10) Patent No.: US 10,684,967 B2
(45) Date of Patent: Jun. 16, 2020

(54) UNIT FOR STORAGE OF BUILDING DIGITAL TECHNICAL DOCUMENTATION, ON SITE; ANY DATA SAVED ON THE UNIT CANNOT BE EITHER MODIFIED, RENAMED OR ERASED AND IT IS ALWAYS POSSIBLE TO ADD NEW DATA AS REQUIRED AS LONG AS MEMORY CAPACITY IS AVAILABLE

(71) Applicant: E-GLOO DEVELOPMENT, Luxembourg (LU)

(72) Inventors: Bernard Blanchet, Versailles (FR); Edouard De Ledinghen, Tessel (FR); Lionel Laurent, Montfort L'Amaury (FR)

(73) Assignee: E-GLOO DEVELOPMENT, Luxembourg (LU)

( * ) Notice: Subject to any disclaimer, the term of this patent is extended or adjusted under 35 U.S.C. 154(b) by 0 days.

(21) Appl. No.: 16/313,308

(22) PCT Filed: Jun. 27, 2016

(86) PCT No.: PCT/EP2016/064813
§ 371 (c)(1),
(2) Date: Dec. 26, 2018

(87) PCT Pub. No.: WO2018/001446
PCT Pub. Date: Jan. 4, 2018

(65) Prior Publication Data
US 2019/0227960 A1 Jul. 25, 2019

(51) Int. Cl.
*G06F 21/00* (2013.01)
*G06F 13/16* (2006.01)
(Continued)

(52) U.S. Cl.
CPC ......... *G06F 13/1668* (2013.01); *C08G 67/02* (2013.01); *C08G 71/04* (2013.01);
(Continued)

(58) Field of Classification Search
CPC combination set(s) only.
See application file for complete search history.

(56) References Cited

U.S. PATENT DOCUMENTS 5,479,341 A * 12/1995 Pihl .................. G06F 21/86
340/542
8,452,934 B2 5/2013 Jogand-Coulomb et al.
(Continued)

FOREIGN PATENT DOCUMENTS

EP 1801800 A2 6/2007
EP 2137799 B1 5/2016

OTHER PUBLICATIONS

International Search Report for PCT/EP2016/064813 dated Jan. 24, 2017.

*Primary Examiner* — Raymond N Phan
(74) *Attorney, Agent, or Firm* — Bachman & LaPointe, P.C.

(57) ABSTRACT

A unit for managing initial saving, subsequent saving, and reading technical information such as plans, figures, executed works, manuals, notebooks, a visitors' book, maintenance records, and the like of a site such as a building, a ship, a platform, an industrial facility, and the like, the unit comprising a casing incorporating an electronic circuit comprising a non-volatile memory, a USB connector and a processor controlled by firmware controlling the management of inputs and outputs and of the memory, wherein the firmware comprises means for managing the inputs-outputs according to the standard USB protocol, and in addition for preventing the change command from modifying information previously recorded in the non-volatile memory.

9 Claims, 1 Drawing Sheet

(51) Int. Cl.
*C08G 67/02* (2006.01)
*C08G 71/04* (2006.01)
*G06F 13/42* (2006.01)

(52) U.S. Cl.
CPC .......... *G06F 13/4282* (2013.01); *G06F 21/00* (2013.01); *G06F 2213/0042* (2013.01)

(56) References Cited

U.S. PATENT DOCUMENTS

| | | | |
|---|---|---|---|
| 9,559,462 B1* | 1/2017 | Mosholder | H01R 13/6397 |
| 9,655,218 B1* | 5/2017 | DePhillips | H05B 33/0863 |
| 2009/0217055 A1* | 8/2009 | Sham | G11B 20/00 |
| | | | 713/189 |
| 2009/0300238 A1 | 12/2009 | Panabaker et al. | |
| 2011/0119429 A1 | 5/2011 | Tu et al. | |

* cited by examiner

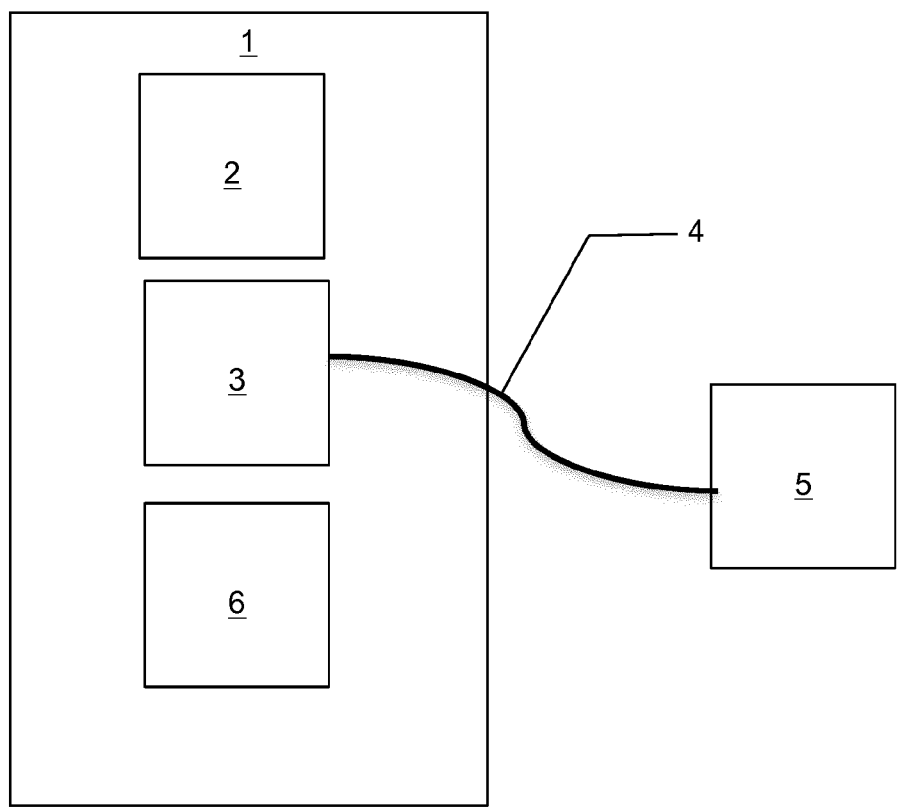

UNIT FOR STORAGE OF BUILDING DIGITAL TECHNICAL DOCUMENTATION, ON SITE; ANY DATA SAVED ON THE UNIT CANNOT BE EITHER MODIFIED, RENAMED OR ERASED AND IT IS ALWAYS POSSIBLE TO ADD NEW DATA AS REQUIRED AS LONG AS MEMORY CAPACITY IS AVAILABLE

BACKGROUND OF THE INVENTION

This invention relates to the field of equipment for archiving on site digital documents relating to, for example, the plan of a building, an industrial site, a marine platform, a ship, its electrical installation, the records of the works carried out, the inspection book, the plans of the technical installations, its equipment and its sub-assemblies, and more generally all the documents that are useful or even mandatory to archive and in order to enable consultation and updating thereof on site.

The European patent EP2137799 describing a unit for the saving of technical information by a user, with said unit being intended to be fixed in a technical cabinet, and in particular to be fixed on a metal rail, is known in the state of the art, with said unit comprising a front opening which can be closed by a closing means, such as a cover or a lid, and further comprising fixing means for fixing said unit 1 in said technical cabinet, and advantageously on said metal rail, and said unit being characterized in that it further comprises (a) at least one antimagnetic and/or antistatic protection means, and (b) a rewritable medium for storing computer data, with said storage medium being a flashdrive type memory having a USB plug, fixed in the unit or in its closing means, so that its USB plug is accessible after opening said closing means, and being protected by said antimagnetic and/or antistatic protection means.

This patent proposes, in an alternative embodiment, a ROM (Read-Only Memory) type memory, programmed or used in such a way as to enable the stacking of new information, without being able to erase the old one.

This prior art document optionally proposes the use of a password for a first access mode. A second access mode enables the user to read and write the data contained in this computer medium. To access this access mode, a password is required. The computer support can be accessed via a network connection, for example via a network connector, which can be of the RJ45 type. It provides for a third mode of access, reserved for the model manufacturer or the agent thereof, i.e. a specially authorised user, to facilitate computer maintenance and enable access to all data without knowing the two passwords indicated above.

The solution proposed in the previous art is not satisfactory.

First, this device cannot work: a flashdrive type memory described in this patent can only have two states: either free read-write; or read-only. A flashdrive memory does not enable the status to be differentiated according to the nature of the information, and therefore does not achieve the stated effect of "enabling the stacking of new data without being able to delete the old data".

Secondly, to secure the operation, a specific application ("driver"), including password management resources, must be used.

This has two disadvantages.

First, security is not really ensured because the USB memory remains accessible by a terminal without the application in question, and this terminal can then freely read and write all the data it wants to from the memory in question.

Secondly, the user who wishes to comply with the specifications of the unit supplier must install the application in question on his/her terminal, which is not without difficulties due to the diversity of operating systems and the evolution thereof over time, and also because many companies statutorily or technically prohibit the installation of applications that have not been expressly approved by the IT department.

SUMMARY OF THE INVENTION

In order to remedy the disadvantages of the prior art, the present invention, in its broadest sense, relates to a unit for managing [initial saving, subsequent saving, reading] technical information [plans, figures, manuals, visit notebooks, files of works carried out (D.O.E.), maintenance records] of a site [building, ship, platform, industrial facility, . . . ] consisting of a casing incorporating an electronic circuit comprising a non-volatile memory, a USB connector and a processor controlled by firmware controlling the management of the inputs/outputs and of said memory, characterized in that said firmware comprises means for managing the inputs-outputs according to the standard USB protocol, and in addition for preventing the change command from modifying information previously recorded in said non-volatile memory.

Advantageously, said means for preventing the change in previously recorded information comprises a memory for recording an addressing table containing the addresses of previously recorded information, with the firmware including a code for comparing the target address in the data packet received via the USB connector and for preventing the registration if said target address belongs to said addressing table.

According to a preferred alternative embodiment, this unit has no power source other than power supply via the USB port.

Preferably, the unit is sealed during assembly.

According to an advantageous embodiment, said unit is waterproof.

Preferably, said unit is injected in a high-performance thermoplastic polymeric material of the aliphatic Polyketone type (called PK).

Advantageously the USB port is formed by a cable connected to the printed circuit board supporting the electronic circuits on the one hand, and having a male USB connector on the other hand.

For example, said USB cable is of the double-shield type with a Polyurethane insulating sheath.

BRIEF DESCRIPTION OF THE DRAWINGS

The invention will be better understood from a reading of a non-restrictive exemplary embodiment, referring to the appended drawings, where:

FIG. 1 shows an exploded view of an exemplary embodiment of the invention.

DETAILED DESCRIPTION

Hardware Architecture

The unit 1 is a rigid thermoplastic unit, for example of the aliphatic polymer Polyketone type (referred to as PK), with a dimension of 150 mm in width, 250 mm in length and 50-mm in thickness.

It contains a printed circuit board whereon a non-volatile memory 2, for example a flash memory, as well as a microcontroller 3, and optionally an additional volatile memory 6 are mounted. A cable 4 connects the printed circuit board to a male USB connector 5.

This microcontroller 3 is for example a component of the MICROCHIP PIC 18 family with a set of 75 instructions. This extensive instruction palette makes it possible to run compiled C code efficiently and to integrate the flashdrive.

Functional Architecture

The USB standard uses a differential transmission pair for the data. This is coded according to an NRZI mode. On low and full speed devices a differential '1' is transmitted by putting D+ above 2.8V with a 15 k-ohms resistance connected to ground and D− below 0.3V with a 1.5 k-ohms resistance connected to 3.6V.

On the other hand, a differential '0' corresponds to D− greater than 2.8V and D+ less than 0.3V with the same high/low pull-down resistances.

The receiver defines a differential '1' with D+ greater by 200 mV than D− and a differential '0' with D+ smaller by 200 mV than D−. The polarity of the signal is reversed as a function of the BUS speed. Consequently, the states referenced by the terms 'J' and 'K' are used to mean the logical levels. At low speed, a state "I" is a differential "0". At high speed, a state "I" is a differential "1".

The USB transmitters/receivers will include both differential and unique (not complementary) outputs. Some USB BUS states are indicated by single ended zero signals on D+, D− or both. For example, a single ended zero or SEO can be used to indicate the reset of a device if it is maintained for more than 10 ms. SEO is generated by maintaining D+ and D− in the lower position (less than 0.3V). Single ended and differential outputs are to be noted if a transmitter/receiver and an FPGA as a USB device are used. Sampling only the differential output is not sufficient.

The low and full speed BUS has a characteristic impedance of 90 Ohms+/−15%. The selection of the resistors of the series electrical characteristics for D+ and D− is therefore important in order to balance the impedance. The whole technical documentation should specify these values and tolerances.

The high speed mode (480 Mbps) uses a constant current of 17.78 mA to request noise reduction.

An important specificity of the invention is that it enables operation with any terminal without requiring a dedicated application. The microcontroller is so programmed as to manage the enumeration step that determines the device that has just been connected to the bus of the host equipment, regardless of its operating system, and the parameters it needs, such as power consumption, number and type of head-ends, product class, etc.

Each USB transaction consists of a:
Token Package (header defining what is expected then)
Optional DATA package (containing the "payload")
Status package (used to validate the transactions and to provide error correction means).

The flashdrive is a Bus managed by the host. The host initiates all transactions. The first packet, also called a token, is produced by the host to describe what will follow and whether the data transaction will be read or written and what the device address and designated head-end will be. The next packet is usually a data packet carrying the "payload" and is followed by a "handShaking" packet, indicating whether the data or token has been received correctly or if the head-end is blocked, or is not available to accept data.

The microcontroller 2 analyzes the contents of the Token packet to check if it contains a target address already in the addressing table 6.

If this is the case, the microcontroller interrupts the process of recording the data in the non-volatile memory 2.

Otherwise, it commands the registration process to continue at a free address, and records in the addressing table the address at which the data is first recorded.

The invention claimed is:

1. A unit for managing initial saving, subsequent saving, and reading technical information such as plans, figures, executed, manuals, notebooks, a visitor's book, maintenance records, and the like of a site such as a building, ship, platform, industrial facility, and the like, said unit comprising a casing incorporating an electronic circuit comprising a non-volatile memory, a USB connector and a processor controlled by firmware controlling the management of inputs and outputs and of said memory,
   wherein said firmware comprises means for managing the inputs-outputs according to the standard USB protocol, and in addition for preventing the change command from modifying information previously recorded in said non-volatile memory.

2. The unit for managing technical information of a site according to claim 1, wherein said means for preventing the change in previously recorded information comprises a memory for recording an addressing table containing addresses of previously recorded information, with the firmware including a code for comparing a target address in a data packet received via the USB connector and for preventing registration if said target address belongs to said addressing table.

3. The unit for managing technical information of a site according to claim 1, wherein said unit has no power source other than the power supply via the USB port.

4. The unit for managing technical information of a site according to claim 1, wherein said unit is sealed during assembly.

5. The unit for managing technical information of a site according to claim 1, wherein said unit is waterproof.

6. The unit for managing technical information of a site according to claim 1, wherein said unit is injected in a high-performance thermoplastic material of the aliphatic polymer Polyketone type which can be fireproofed.

7. The unit for managing technical information of a site according to claim 1, wherein the USB port is formed by a cable connected to the printed circuit board supporting the electronic circuits on the one hand, and having a male USB connector on the other hand.

8. The unit for managing technical information of a site according to claim 7, wherein said USB cable is double-shielded with an insulating sheath of Polyurethane.

9. A unit for managing initial saving, subsequent saving, and reading technical information such as plans, figures, executed, manuals, notebooks, a visitor's book, maintenance records, and the like of a site such as a building, ship, platform, industrial facility, and the like, said unit comprising a casing incorporating an electronic circuit comprising a non-volatile memory, a USB connector and a processor controlled by firmware controlling the management of inputs and outputs and of said memory,
   wherein said firmware comprises means for managing the inputs-outputs according to the standard USB protocol, and in addition for preventing the change command from modifying information previously recorded in said non-volatile memory; said unit has no power source other than the power supply via the USB port; and said unit is sealed during assembly and waterproof.

* * * * *